(12) United States Patent
Crilly, Jr. et al.

(10) Patent No.: US 9,467,230 B2
(45) Date of Patent: Oct. 11, 2016

(54) DISTRIBUTED ANTENNA SYSTEM HAVING HIGH NEAR FAR PERFORMANCE

(71) Applicant: Westell, Inc., Aurora, IL (US)

(72) Inventors: William J. Crilly, Jr., Dunbarton, NH (US); David J. Schwartz, Tualatin, OR (US)

(73) Assignee: Westell, Inc., Aurora, IL (US)

( * ) Notice: Subject to any disclaimer, the term of this patent is extended or adjusted under 35 U.S.C. 154(b) by 2 days.

(21) Appl. No.: 14/195,386

(22) Filed: Mar. 3, 2014

(65) Prior Publication Data

US 2014/0248050 A1 Sep. 4, 2014

Related U.S. Application Data

(60) Provisional application No. 61/771,823, filed on Mar. 2, 2013.

(51) Int. Cl.
| | |
|---|---|
| *H04B 10/08* | (2006.01) |
| *H04B 17/00* | (2015.01) |
| *H04B 13/02* | (2006.01) |
| *H04B 10/2575* | (2013.01) |

(52) U.S. Cl.
CPC .. *H04B 10/25753* (2013.01); *H04B 10/25758* (2013.01)

(58) Field of Classification Search
CPC ... H04B 1/723; H04B 1/712; H04W 88/085; H04W 16/18; H04W 24/02; H03H 17/062
USPC .................... 398/38, 115, 116, 117
See application file for complete search history.

(56) References Cited

U.S. PATENT DOCUMENTS

| | | | | |
|---|---|---|---|---|
| 5,465,406 A | * | 11/1995 | Whitecar | H03G 3/3052 375/345 |
| 5,555,453 A | * | 9/1996 | Kajimoto | H04B 1/28 455/266 |
| 6,397,048 B1 | * | 5/2002 | Toda | H03H 17/0621 375/316 |
| 6,804,540 B1 | | 10/2004 | Shepherd et al. | |
| 8,787,429 B2 | * | 7/2014 | Jovanovic | H04L 25/03019 370/315 |
| 2001/0001616 A1 | * | 5/2001 | Rakib | H03M 13/256 375/259 |

(Continued)

FOREIGN PATENT DOCUMENTS

WO 2011139939 A1 11/2011

OTHER PUBLICATIONS

Adam Farson, AGC and Noise Blanker in an IF-DSP Receiver, http://web.archive.org/web/20100801000000*/http://www.ab4oj.com/icom/ic7700/agc_nb.html.*

*Primary Examiner* — David Payne
*Assistant Examiner* — Pranesh Barua
(74) *Attorney, Agent, or Firm* — Michael J. Curley; Quarles & Brady LLP

(57) ABSTRACT

The system and method for ameliorating the effect of close-in user equipment up to a point where the user equipment itself limits the performance. The system and method utilizes a digital filter in front of the LASER modulator being applied to the LASER. Additionally, total power detectors may be used at input to prevent unwanted signals from overloading stages in front of the LASER. In uplink and downlink directions, bidirectional digital filtering in the RUs allows the selective use of a given RU in a given sub-band, by a given WSP. The use of digital filtering in the RU reduces the need for hardware RF switching at the head end to accomplish the same objective of signal flexibility, by one of more WSPs, providing one or more sectors exists within the DAS.

8 Claims, 8 Drawing Sheets

(56) References Cited

U.S. PATENT DOCUMENTS

| | | | |
|---|---|---|---|
| 2006/0046764 A1* | 3/2006 | Ohba | H04L 27/2614 455/522 |
| 2008/0112470 A1* | 5/2008 | Cleveland | H04B 1/40 375/219 |
| 2011/0135308 A1* | 6/2011 | Tarlazzi | H04B 7/0413 398/79 |
| 2011/0177827 A1 | 7/2011 | Crilly, Jr. et al. | |
| 2011/0201269 A1* | 8/2011 | Hobbs | H04B 7/15535 455/9 |
| 2011/0268449 A1 | 11/2011 | Berlin et al. | |
| 2012/0134666 A1 | 5/2012 | Casterline et al. | |
| 2012/0309328 A1* | 12/2012 | Morrison | H04B 1/525 455/78 |
| 2012/0329523 A1* | 12/2012 | Stewart | H03F 1/3247 455/562.1 |
| 2013/0095870 A1* | 4/2013 | Phillips | H04W 52/146 455/501 |
| 2014/0024402 A1* | 1/2014 | Singh | H04B 17/23 455/501 |
| 2014/0064348 A1* | 3/2014 | Braz | H04B 1/12 375/227 |

* cited by examiner

DISTRIBUTED ANTENNA SYSTEM HAVING HIGH NEAR FAR PERFORMANCE

CROSS REFERENCE TO RELATED APPLICATIONS

This Application claims the benefit of U.S. Provisional Application No. 61/771,823, filed Mar. 2, 2013, the content of which is incorporated by reference herein in its entirety.

FIELD OF THE INVENTION

The present invention relates to distributed antenna systems, and, more particularly, to distributed antenna systems utilizing digital filters to establish high near-far performance.

BACKGROUND OF THE INVENTION

Wireless coverage inside buildings is generally reduced due to the attenuation caused by the buildings. A solution to this problem is the use of a distributed antenna system ("DAS"). The present invention is a system comprising a DAS with one or more digital filters to reduce unwanted signals from being applied to the LASER and to reject broadband noise from the LASER from being transmitted to and interfering with User Equipment ("UE") thereby enhancing the uplink and downlink dynamic ranges of the DAS.

These aspects of the invention are not meant to be exclusive and other features, aspects, and advantages of the present invention will be readily apparent to those of ordinary skill in the art when read in conjunction with the following description and accompanying drawings.

SUMMARY OF THE INVENTION

One aspect of the present invention is a distributed antenna system comprising one or more interfaces to one or more base stations; one or more optical paths; one or more analog to digital and/or digital to analog converters; one or more remote units, having a plurality of sub-bands and digital signal processing; a photodiode; a LASER; one or more server antennas; and uplink and/or downlink digital filtering, wherein the digital filtering is in one or more remote units thereby improving the uplink and/or downlink Near Far performance of the distributed antenna system.

One embodiment of the system is wherein selective uplink and downlink filtering occurs at a first remote unit to allow the selective transmission and reception of a selected sub-band within the first remote unit.

One embodiment of the system is wherein a downlink combined signal is carried by an optical path to a second remote unit, transmitting the downlink combined signal, wherein the downlink combined signal is filtered by the first remote unit, thereby reducing the requirement for hardware switching of signals.

One embodiment of the system further comprises a total power detector to prevent unwanted signals from overloading stages in front of the LASER.

One embodiment of the system further comprises a sub-band specific uplink automatic gain control feature within the digital signal processing in the remote unit.

One embodiment of the system further comprises one or more detectors operating within the digital signal processing, and in front of the analog to digital converter, to protect the analog to digital converter from overload.

One embodiment of the system is wherein the digital filtering within a remote can be eliminated when Near Far performance degradation does not occur.

One embodiment of the system is wherein uplink attacks and decay times operating in the automatic gain control feature are dependent on the technology used for the downlink of the same sub-band.

One embodiment of the system is wherein the selection of the delay of a digital filter in the uplink and/or downlink paths is used to equalize the delay of the transmission time of signals from multiple remote units, while simultaneously meeting the rejection requirements of the digital filter.

One embodiment of the system is wherein flexible signal selection is accomplished without requiring an RF switch at the head end, when there are no co-channel signals within a DAS.

These aspects of the invention are not meant to be exclusive and other features, aspects, and advantages of the present invention will be readily apparent to those of ordinary skill in the art when read in conjunction with the following description, appended claims, and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
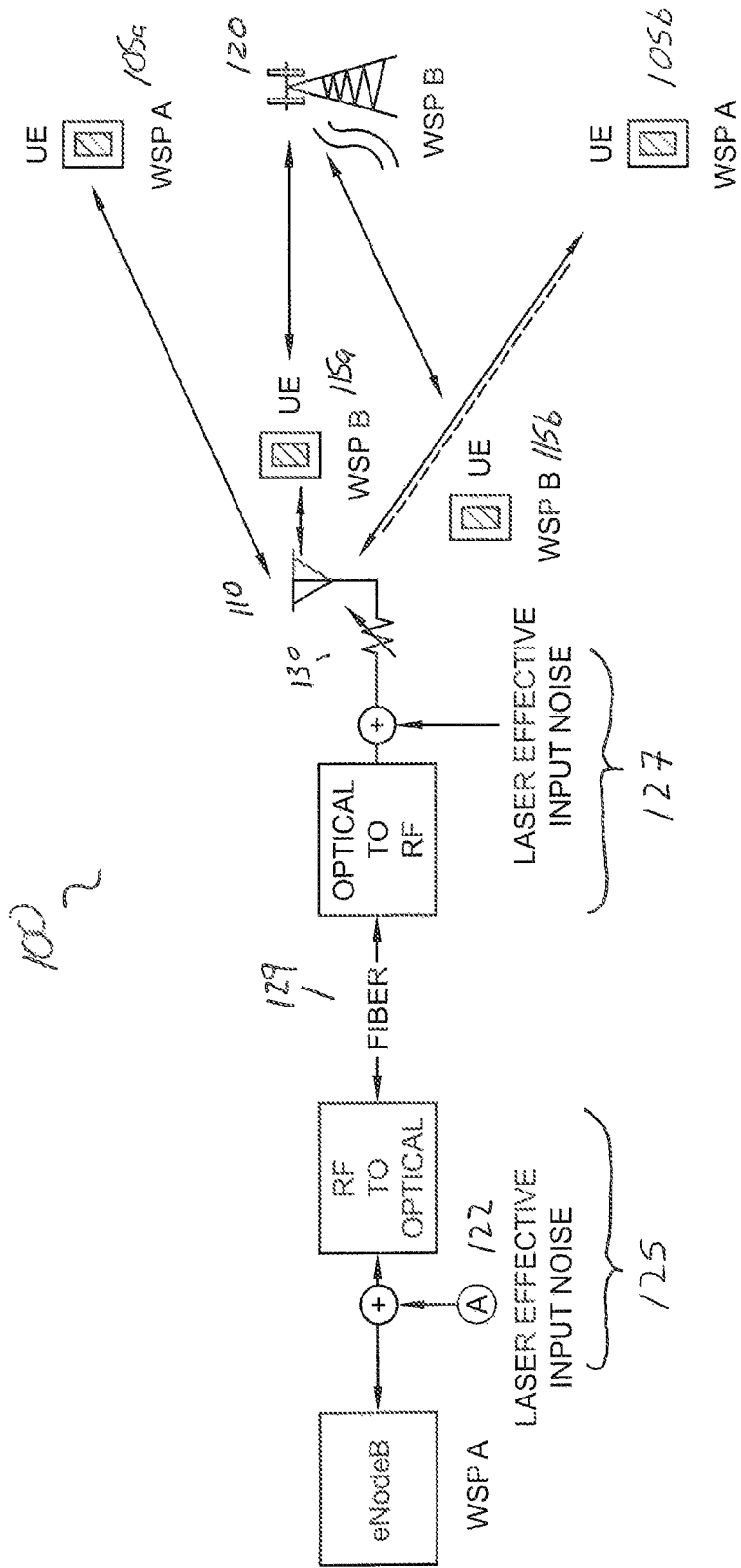
FIG. 1 shows a conventional prior art DAS system, describing the uplink and downlink path.

Wireless coverage inside buildings is generally reduced due to the attenuation caused by building materials and blockages. Wireless signals from macro cell sites experience reduced levels resulting in low speed data connections and potentially lost voice connections. The solution to this problem is the use of a Distributed Antenna System (DAS). If the DAS is passive, it may be comprised of coaxial cable, splitters and antennas, generally called server antennas, and the like. If the DAS is active, it uses one or more amplifiers, combined with systems to efficiently carry the wireless signals from the source of the signals to the server antennas for propagation to User Equipment ("UE"). UEs include, but are not limited to, cellphones, smartphones, wireless modems, tablets, and the like. Media conversion is often done between coaxial cable and fiber optic cable. Generally, fiber is preferred because it is lightweight and has low loss at high distance.

The conversion of RF signals to be carried over the fiber optic cable usually involves the use of a LASER to produce modulated light. Conversion from light to modulation to RF signals is usually done with a photodiode. There are several possible sources of RF signals, including, but not limited to a cellular base station, referred to as a eNodeB for LTE signals, an off-air repeater, or a small cell, which is a type of base station that has reduced capacity compared to a full eNodeB with multiple sectors, and the like.

One objective of the DAS transport system is to transport the source RF signals to one or more server antennas with a minimum loss of signal purity and fidelity. Signal purity and fidelity are generally quantified in one or more of the following measures: Adjacent Channel Power, Alternate Channel Power, Broadband Noise, Spurious Signals, Intermodulation Products, and in-channel Signal to Noise Ratio to name a few. Each of these measures is affected to some degree by the performance of the LASER and photodiode that are used to transport the RF signals.

RF signals may be transported in a variety of ways. It is common that RF signals are carried directly by amplitude modulating the optical power. Signals may also be carried by frequency modulating a subcarrier with a base band version of the RF signal. Signals may also be carried by modulating the optical power with a low frequency, or the base band components of the RF signal. The RF signal may be down-converted, digitized, and transmitted over the fiber using Pulse Code Modulation ("PCM"). There are advantages and disadvantages to each method.

In general, methods of signal transport that require the greatest signal processing tend to be the costliest, and have the highest performance. For example, down-conversion, digitization, and optical PCM tend to have the greatest performance and highest cost per MHz of signal transported. Analog modulation of the optical power is generally the least costly, as no digitization and frequency conversion is required. Methods that use other types of modulation, e.g., OFDM modulation of a subcarrier, have costs and complexity similar to PCM. The use of commonly available standardized PCM transport, e.g., 10 Gigabit Ethernet, has the potential to reduce costs in the future, but presently does not meet the lower cost of pure analog transport of RF signals. This is due partially to the requirement that signals must be down-converted and digitized for transport.

The digital filter of one embodiment of the DAS system of the present invention is used on the uplink to reduce unwanted signals from being applied to the LASER, thus "enhancing" the overall DAS uplink dynamic range, above the dynamic range of the uplink LASER. On the downlink, the LASER emits broadband noise. The digital filter of one embodiment of the DAS system of the present invention is in the remote unit and rejects almost all of this broadband noise from transmission to and subsequent interference with UE, therefore enhancing the downlink dynamic range of the DAS.

In certain embodiments, the downlink signals are applied to the LASER, through conditioning, from Base Stations, eNodeBs, repeaters and other RF sources and are not necessarily digitally filtered before application to the downlink LASER. There is no need to apply digital filtering at the DAS head end, in the downlink direction, because the signals that are applied to the downlink LASER are intended to be transmitted, or selectively rejected by the digital filter. In certain embodiments, downlink signals that are applied to the LASER are selectively rejected in the remote unit, simplifying switching arrangements. In certain embodiments of the present invention, the DAS provides electronically-switched selective choice of downlink transmitted signals, on a remote unit by remote unit basis. If a particular downlink signal is selectively not transmitted then its uplink is also rejected in the digital filter.

In certain embodiments, it is preferred to provide a solution that uses analog transport. However, there is a limitation in the performance of the link, as described by parameters such as the Adjacent Channel Power. This limitation is primarily due to the limited dynamic range of LASERs used to convert RF to optical power. These LASERs have a characteristic called Relative Intensity Noise ("RIN"), that limits the low-level performance of the optical signal. At the high end, the LASER is unable to modulate a signal at RF power levels that exceed the optical power level of the light carried over the fiber. For cost and safety reasons, this optical power is limited to approximately 1 mW or less. The composite power applied to the LASER modulator is usually a few tens of dB below the optical power.

The combination of RIN and limited high end performance generally reduces the dynamic range of the RF-optical link greatly. Using modern devices, the dynamic range of optical links is approximately twenty dB worse than the dynamic range of modern analog to digital convertors and digital to analog convertors.

It is recognized that the path from eNodeB or repeater to UE is bidirectional. Both Uplink and Downlink signals are carried using Frequency Division Duplex on one or more fibers. The characteristics of optical systems described in certain embodiments of the present invention applies to signals carried in either direction. The degradation of performance described herein results from the use of conventional methods to improve dynamic range. It is one object of this invention to use unconventional techniques to improve the dynamic range performance of an optical fiber transport RF link.

Reduction in dynamic range can be exhibited in a DAS by a degradation of Near-Far performance. Near-Far refers to the performance of a UE that is far from a server antenna, while interfering signals are transmitted from a UE that is near a server antenna. The User Equipment that is far from the server antenna may lose uplink performance if attenuation is added to protect the LASER modulator from overload due to the close-in Near Signal.

In the opposite direction, User Equipment that is not served by the DAS may receive a high level of broadband noise, when near a server antenna. In this scenario, the LASER modulator is driven to a low level of modulation, while the signal is amplified for transmission by the server antenna. The broadband noise, caused by RIN is also amplified. This noise is described in FIG. 1 as an effective input noise that is referred to the electrical modulation input of the LASER, shown as (A) (( )=a circle) in FIG. 1. The effective input noise is carried by the various stages within the DAS to eventually be transmitted within an entire wireless band. A particular WSP usually only utilizes a portion of the band. However, the broadband noise is transmitted over the entire band. Some of the unwanted noise energy from the LASER, in this band, falls within a sub-band in the band that is allocated to another WSP. The UE that is near a server antenna is often de-sensed by this noise.

WSPs do not always ensure that their signals are present on all DASs. Therefore, the use of a DAS by one WSP reduces the performance of the UE of the non-DAS carried WSP. It is an objective of this invention to ameliorate the downlink and uplink Near-Far issues caused by RF over fiber links. Some of the scenarios addressed by this invention involve the following: UEs that have service provided by the DAS that are far from a server antenna while other strong sources are near a server antenna, and UEs that do not have service provided by the DAS, that are close to a server antenna, reducing the throughput from a UE that is on the DAS, and far from a server antenna. See, for example, FIG. 1.

Still referring to FIG. 1, a prior art, conventional, DAS system 100, describing the uplink and downlink path is shown. The UEs shown as WSP A (105a, b), are located far from a server antenna 110. To perform well, the power applied to the server antenna 110 must be moderately high. Values typically range between 0 and +20 dBm per channel, depending on coverage requirements within a building, wall attenuation, and desired throughput at a distance. At high power levels, the broadband noise caused by LASER RIN (A) 122 sets a broadband noise floor that degrades the performance of the UEs of WSP B (115a, b), served by the macro cell site of WSP B 120. Problems arise due to strong signals from WSP B UEs (115a, b) close to a server antenna 110, and broadband noise to WSP B UEs (115a, b).

FIG. 1 shows bidirectional uplink and downlink operation of a prior art DAS system 100. Each electrical to optical block (e.g., 125, 127) comprises a LASER and a photodiode for sending or receiving optical signals along optical path 129). The LASER in the RU 127 is used to carry the uplink signals. Strong UE signals from the near WSP B UE (115a, b) can overdrive the uplink LASER and require attenuation 130, shown between LASER and antenna 110, to be increased. The increase of this uplink attenuation degrades the desired coverage area of the DAS 100 by WSP A.

Figure 3:
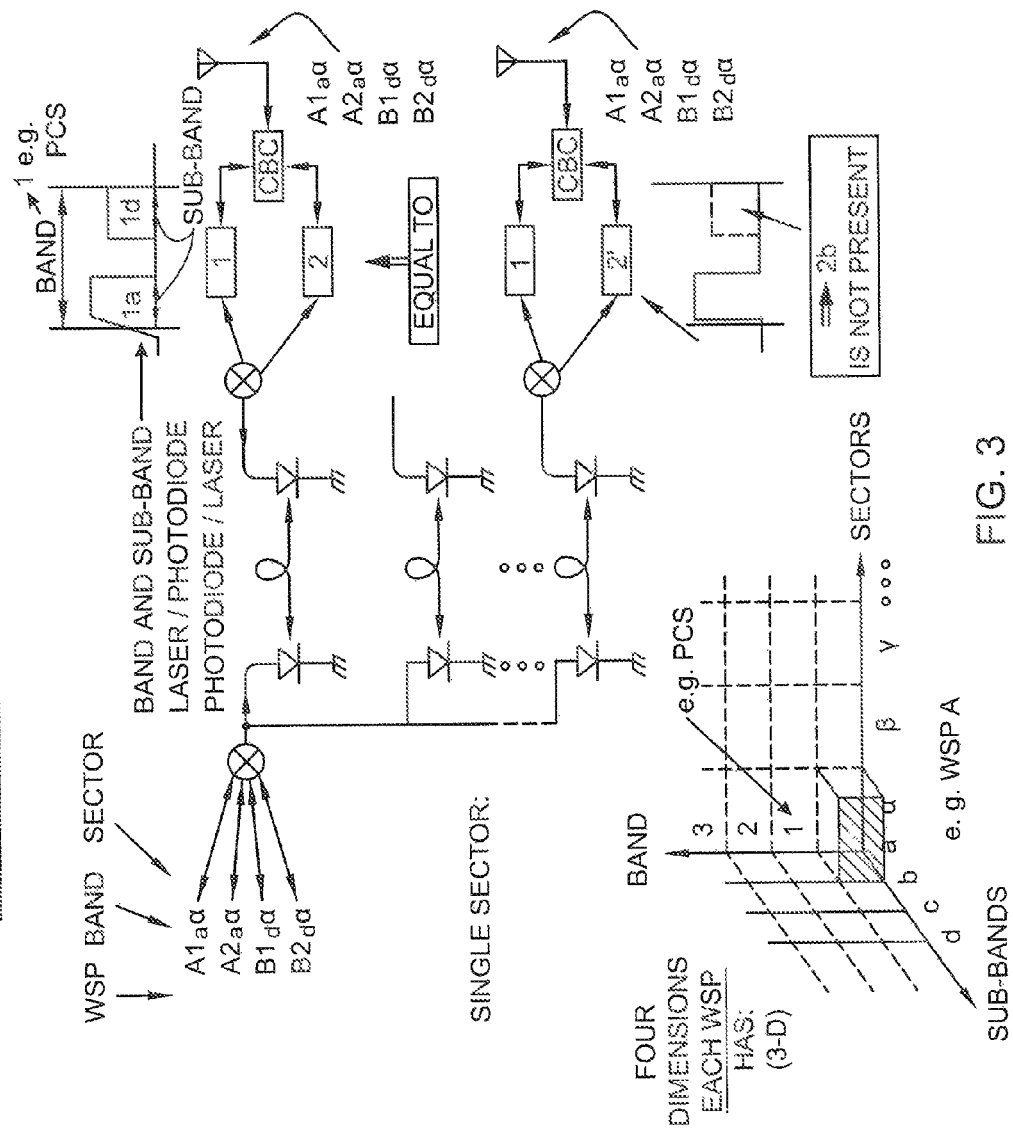
FIG. 3 shows a schematic of one embodiment of the DAS system of the present invention.

In contrast, the present invention adds down conversion, digital filters, and up conversion, and other stages listed above. FIG. 3 additionally describes some of the nomenclature used for the flexibility of the DAS of the present invention. Capital letters, numbers, subscripts and Greek letters are used to identify WSPs, bands, sub-bands and sectors respectively. In certain embodiments of the present invention, the added items contained within the system are found between the downlink photodiode and the remote unit downlink output; and the remote unit antenna uplink input and the uplink LASER.

Near-Far performance is often measured using the parameters of adjacent channel selectivity for a receiver, and adjacent channel power for a transmitter. These parameters are important because the WSP A and WSP B do not use the same frequency spectrum. Adjacent channels are those in closest proximity in frequency to a desired channel. In addition to adjacent channels, there are multiple alternate channels that extend on both sides of the desired channel beyond the adjacent channels.

The performance of a radio link may be determined by the adjacent channel power of a transmitter together with the adjacent channel selectivity of a receiver. In general, the limitation in performance may be caused by either parameter, or together in combination. It is an objective of this invention to provide a system that reduces cost and complexity while using the approximately known performance of the devices, UEs, adjacent, alternate channel selectivity, and power. For example, a UE that has very high adjacent channel power, and is located close to a sever antenna, will limit the uplink performance due to noise transmitted in the desired channel carried by the DAS.

It is desirable that the DAS uplink be able to operate without performance degradation in the presence of this near strong signal. There are two problems that can arise 1) The UE strong carrier signal overloads the LASER on the high end of its modulation range, and 2) the broadband noise of the UE, or its adjacent or alternate channel power, applied to the LASER, falls in band to the desired channel. Either effect can degrade the performance of the uplink in the desired channel.

In one embodiment of the present invention, a mechanism is provided to ameliorate the effect of the close-in UE, up to a point that the UE itself limits the performance. In certain embodiments, the mechanism provided is a digital filter used in front of the LASER modulator being applied to the LASER. Digital filters may be designed to have a particular level of dynamic range.

As a signal is digitally filtered, while sufficient bits are carried through the filtering calculation, dynamic range generally increases. The overall dynamic range of the input of the digital signal processing ("DSP") process is established by the digitizer, or Analog to Digital Converter ("ADC"). A typical ADC has a signal to noise ratio ("SNR") related to the number of bits provided by the ADC output, and generally has a maximum SNR that increases by 6 dB for each bit of resolution added. ADC dynamic range is related to the SNR, providing that the ADC has sufficient intermodulation performance to not degrade low level unwanted power above the noise, before the ADC full scale power is reached.

The dynamic range of a digital filter is affected generally by several effects: analog to digital conversion, quantization noise in filtering, limited out of band rejection of the digital filter, and digital to analog conversion. The cost and complexity of the devices used are chosen such that the best balance of dynamic range is achieved. In certain embodiments of the present invention, these parameters are also traded off to provide the best balance for the UE performance. For example, the level of out of band attenuation and the slope of rejection are traded off to provide a level near-signal performance that is not greatly more than the performance of the UE itself. For example, if a LASER is able to handle −20 dBm of unwanted signal power, and the UE just raises the desired channel power at this level, then the degree of filtering of adjacent signals may be adjusted to cause out of band signals to be close to −20 dBm composite power, but not −60 dBm, for example. By reading the need for stop band attenuation of the digital filter, the filter may be made to have a smaller transition band. This provides rejection of unwanted signals that are close by in frequency to the desired channel, and also can reduce the cost and complexity of the digital filter.

The complexity and delay of a digital filter is strongly dependent on the degree of stop band attenuation required. This stop band attenuation is chosen to provide a tradeoff between the rejection of LASER noise and adjacent channel rejection, and the delay and complexity of the filter. Delay in a DAS is an important design criteria, and may be implemented to be greater than the minimum delay of a filter that meets rejection requirements. This greater delay is useful when, for example, signals must be transmitted at the same time from multiple antennas connected to multiple remote units. For example, a digital filter may meet the rejection requirements, using 400 FIR taps, while an additional 300 delay taps may be effectively added to equalize the transmission time of two digital filters in different remote units, located at an antenna separation equivalent to the additional 300 tap delay.

In the downlink direction, the LASER RIN de-senses close-in UEs that are not served by the DAS. These close-in UEs have adjacent channel selectivity, and alternate channel selectivity to reject unwanted signals. The LASER RIN will be received by the UE in the pass band of the UE. If the adjacent channel selectivity of a UE is sufficient to reject the downlink signal transmitted by the server antenna, the UE may still be de-sensed by the broadband RIN of the LASER. In certain embodiments of the present invention, the downlink signal is digitally filtered to reduce the LASER RIN that is transmitted, to a point that provides ultimate performance determined primarily by the UE adjacent channel selectivity. For example, the DAS used at the output of the digital filter may be chosen to have a bandwidth and noise floor that will not de-sense a close in UE. In this way, overall cost is reduced.

For example, a UE, served by a macro cell site, may be blocked and first de-sensed by an alternate channel signal on the DAS, at or above −20 dBm, referred to the UE antenna input. The UE in this example uses a 10 MHz bandwidth, and has a Noise Figure of 4 dB, and is located a distance that corresponds to 50 dB path loss from the server antenna. The downlink effective noise of the UE, due to its Noise Figure performance and bandwidth is −100 dBm/10 MHz, using a 70 dB (10 MHz/1 Hz) bandwidth factor, and −174 dBm/Hz matched load noise at 290 K. If the server antenna is transmitting +20 dBm in the desired WSP sub-band, the unwanted signal from the DAS, at the UE, is −30 dBm, due to path loss. This value is 10 dB below the blocking level of the UE, and therefore generally has little effect on UE downlink performance. If the remote unit in the DAS transmits a LASER-caused broadband noise power of −30 dBm/10 MHz, then the resulting broadband noise at the antenna of the UE is −80 dBm/10 MHz, due to path loss. This unwanted noise level is 20 dB higher than the inherent effective input noise of the UE. A 20 dB degradation in in-band SNR usually will cause a UE to decrease performance from its maximum downlink speed to close to, or at, a lost connection. The DAS broadband noise level is present at all times, while the blocking signal is only present when the WSP is transmitting on the DAS. Therefore, the effect of continuously transmitted broadband noise caused by the LASER is significantly worse than the intermittent blocking signal transmitted by the DAS.

In addition to the uplink filtering provided by the digital filter, this invention also uses a total power detector at its input to prevent unwanted signals from overloading stages in front of the LASER. Generally, a down converter and ADC are used to sample the RF for digital filtering. These stages are subject to overload and therefore have a mechanism to reduce gain when one or more UEs are near a server antenna. The attack and decay time characteristics of the Automatic Gain Control ("AGC") that is used to protect the RU front end is optimized given the scenario and physical layer technology used for near and far user equipment.

In the downlink direction, an AGC mechanism ensures that the maximum power is not exceeded, and that the total power transmitted does not degrade the adjacent and alternate power due to intermodulation. This may be accomplished by placing a detector diode or power measuring system at the downlink output of the server port, and controlling the transmit gain to reduce out of channel spectral emissions. Alternatively, measurements may be made within the digital domain to determine the level of attenuation required in the downlink. Similarly, measurements may be made after the ADC, in the uplink path, to determine if strong signals may overload the ADC.

Digital processing is not required at the end of the link served by the eNodeB or off-air repeater. This is because the eNodeB and repeater are able to handle the signals pre-filtered by the digital filter within the DAS, and do not need to be filtered in the downlink path. The part of the system on the eNodeB side of the optical link is often referred to as the head-end unit, while the part of the system at the server end is often referred to as a remote unit ("RU"). In the implementations used in this invention, the head-end will generally have lower cost and complexity than a PCM optical system because no digital processing is required in the head-end unit.

It is possible that RUs may serve areas that have a combination of coax splitters and antennas that mitigate the Near-Far problem. In this case, digital filtering in a RU may not be needed. In one embodiment of the present invention, a RU may be configured with, or without, digital filtering to accommodate a deployment that does not experience Near-Far issues. Digital filtering capability in the RU may be configured in the RU through modules installed, or a factory-shipped fixed capability. In general, a modular approach is preferred, as it can ameliorate a Near-Far problem that was not anticipated during the design and purchasing of the original DAS components.

In certain embodiments of the present invention, the system encompasses the use of digital filtering in the RU of a DAS to reduce the required dynamic range of the LASER used in the uplink direction. The digital filter ensures that only those uplink signals that must be carried by the DAS are actually applied to the LASER. See, for example, FIG. 2A.

Figure 2A:
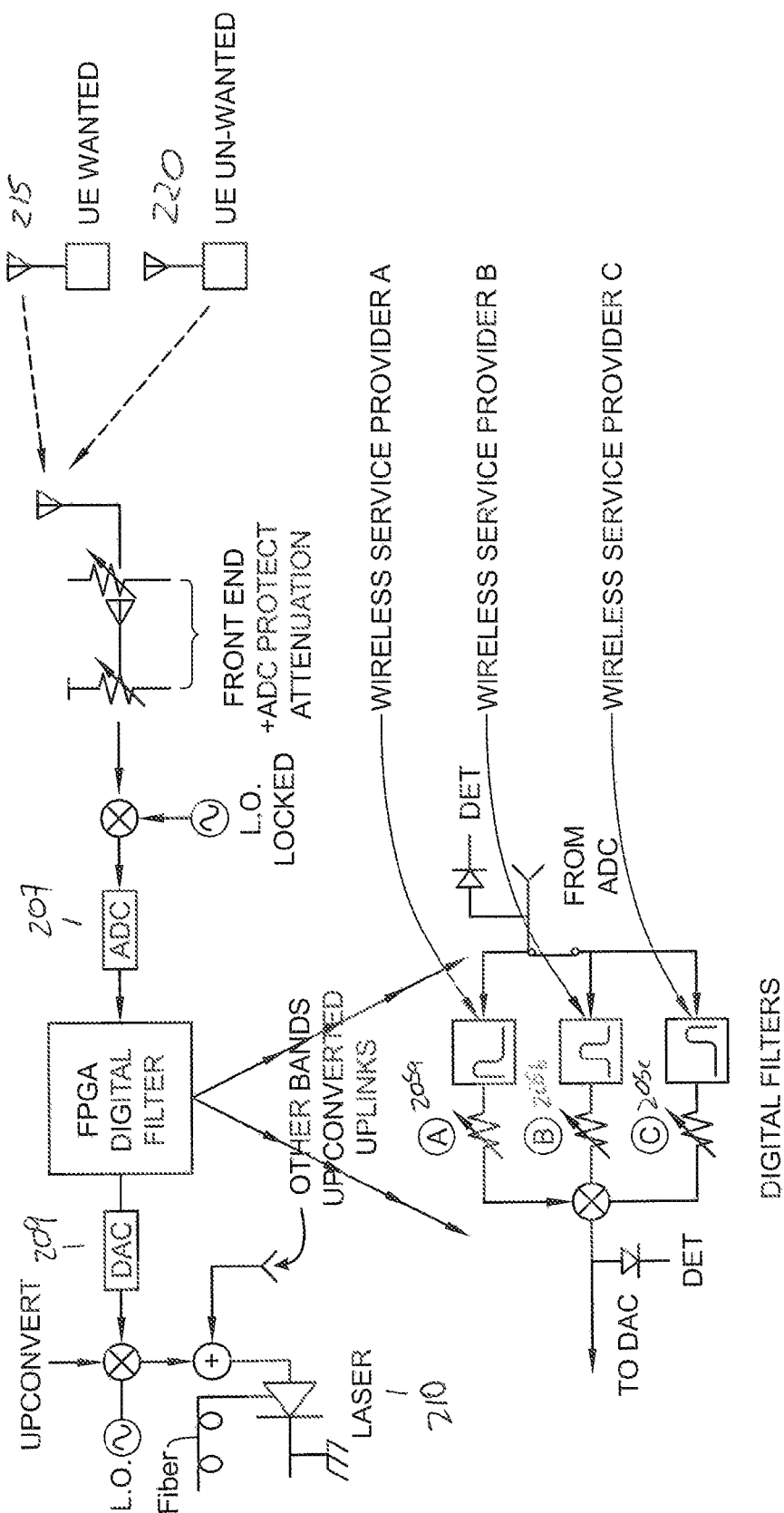
FIG. 2A shows a schematic of one embodiment of the remote selection of sectors and sub-bands of the DAS system of the present invention in the uplink direction.

Referring to FIG. 2A, a schematic of one embodiment of the remote selection of sectors and sub-bands of the DAS system of the present invention in the uplink direction is shown. In certain embodiments, the digital attenuators @ A, B, C (205a, b, c) arranged between analog to digital converter 207 and digital to analog converter 209 are used on a sub-band selective basis to reduce the level of signals applied to the LASER 210. Generally, UEs 215, 220 are power controlled to a low level to reduce their power, as received at the eNodeB. However, there are some scenarios where a high power level may still be present including, but not limited to 1) set up activities where handsets typically transmit at full power; 2) the presence of a large number of UE devices in a particular sub-band; and 3) UEs that operate outside of the power control loop of the UE. In these situations, it is advantageous to reduce the power in a particular sub-band, as applied to the LASER. This can be done using an AGC mechanism using the "det" or detector devices before or after the digital signal processing. Condition 3, described above, will generally occur when UEs are very close to server antennas. In this situation, protection of the LASER is accomplished. In certain embodiments, protection of the ADC is performed.

In certain embodiments, attenuators, gain automatic gain control, filters, test tones, and detectors are added to the system. Certain embodiments of the downlink path comprise: a wireless provider base station; base station conditioning, filtering; combiners and splitters, optional signal switching; electrical to optical conversion; fiber, interface between Head End and Remote Unit; optical to electrical conversion; down conversion; analog to digital conversion; DSP including, filtering, level control, and the like; digital to analog conversion; up conversion, a power amplifier, or the like.

Certain embodiments of the uplink path comprise: low noise Amplifiers; uplink overload protection; down conversion; analog to digital conversion; DSP including filtering, level control per sub-band; digital to analog conversion; up conversion; electrical to optical conversion; fiber, interface between Remote Unit and Head End; optical to electrical conversion; combiners from other RUs; optional signal switching; base station conditioning; filtering or the like.

Figure 2B:
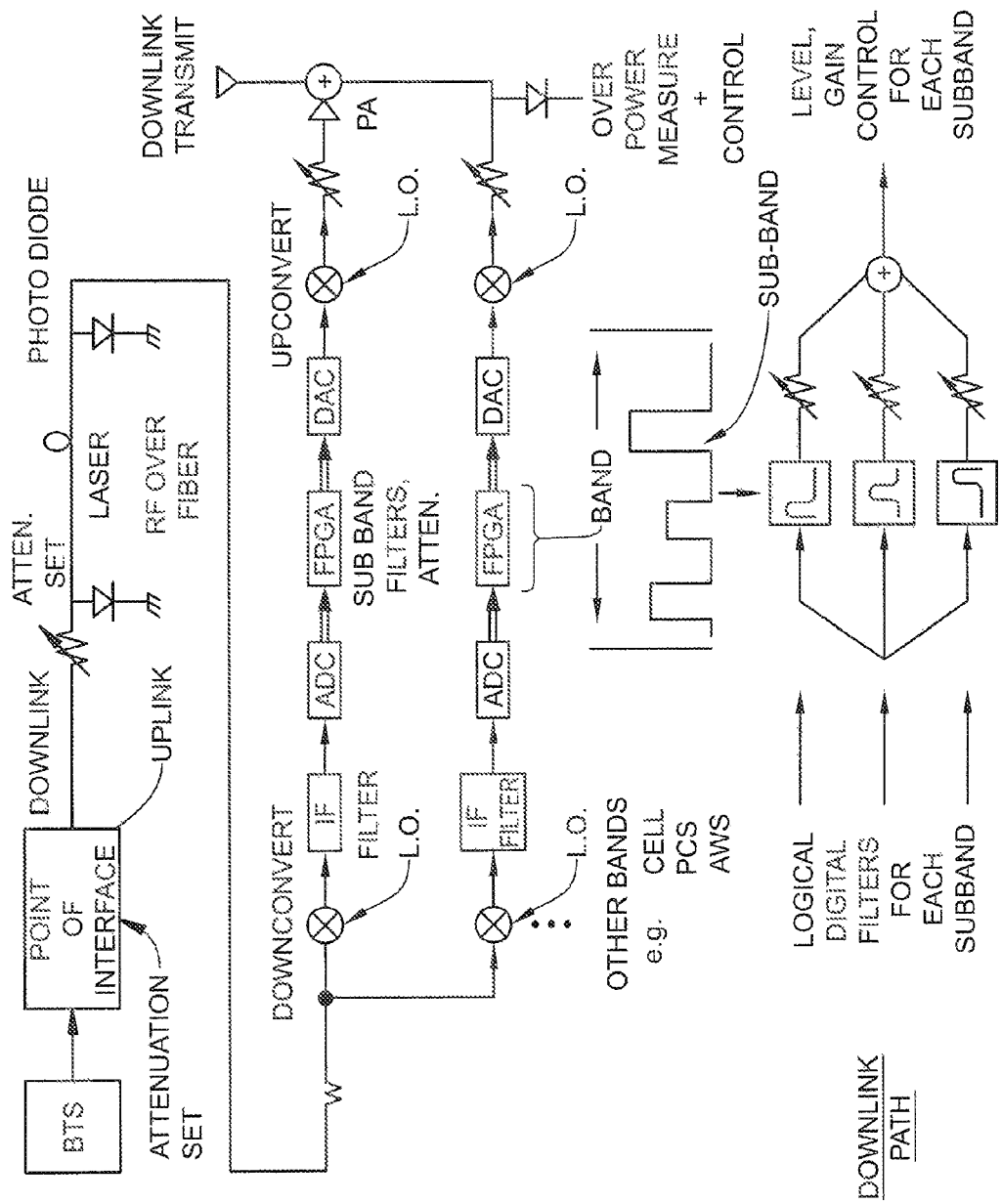
FIG. 2B shows a schematic of one embodiment of the remote selection of sectors and sub-bands of the DAS system of the present invention in the downlink direction.

Referring to FIG. 2B, a schematic of one embodiment of the remote selection of sectors and sub-bands of the DAS system of the present invention in the downlink direction is shown.

In certain embodiments, an algorithm is used to ensure that the adjacent and alternate channel power of signals applied to the LASER do not affect the performance of other WSP sub-bands. For example, this algorithm may predict the expected adjacent channel power, given know LASER performance, and known in-band power, and adjust the attenuator at the corresponding location A, B and/or C to reduce the power applied to the LASER. The criteria for adjustment of power may be that the LASER noise to be degraded by more than 3 dB, for example. In certain embodiments of the present invention, an algorithm is used for each WSP with known values of power applied in each sub-band.

Referring to FIG. 3, a single sector of each WSP (A, B, . . . ) is driving a set of N RUs. Within this system, bands or sub-bands may be removed from particular RUs. For example, WSP B is not supplying sub-band 2$b$ through remote N. Remote N uses a digital filter that does not pass sub-band 2$b$. Sub-bands 1$a$, 2$a$ and 1$d$ are passed by the digital filter. This allows flexibility in WSP use of the DAS, on a sub-band basis. FIG. 3 additionally describes the nomenclature used for the flexibility of the DAS. Capital letters, numbers, subscripts and Greek letters are used to identify WSPs, bands, sub-bands and sectors respectively.

Figure 4:
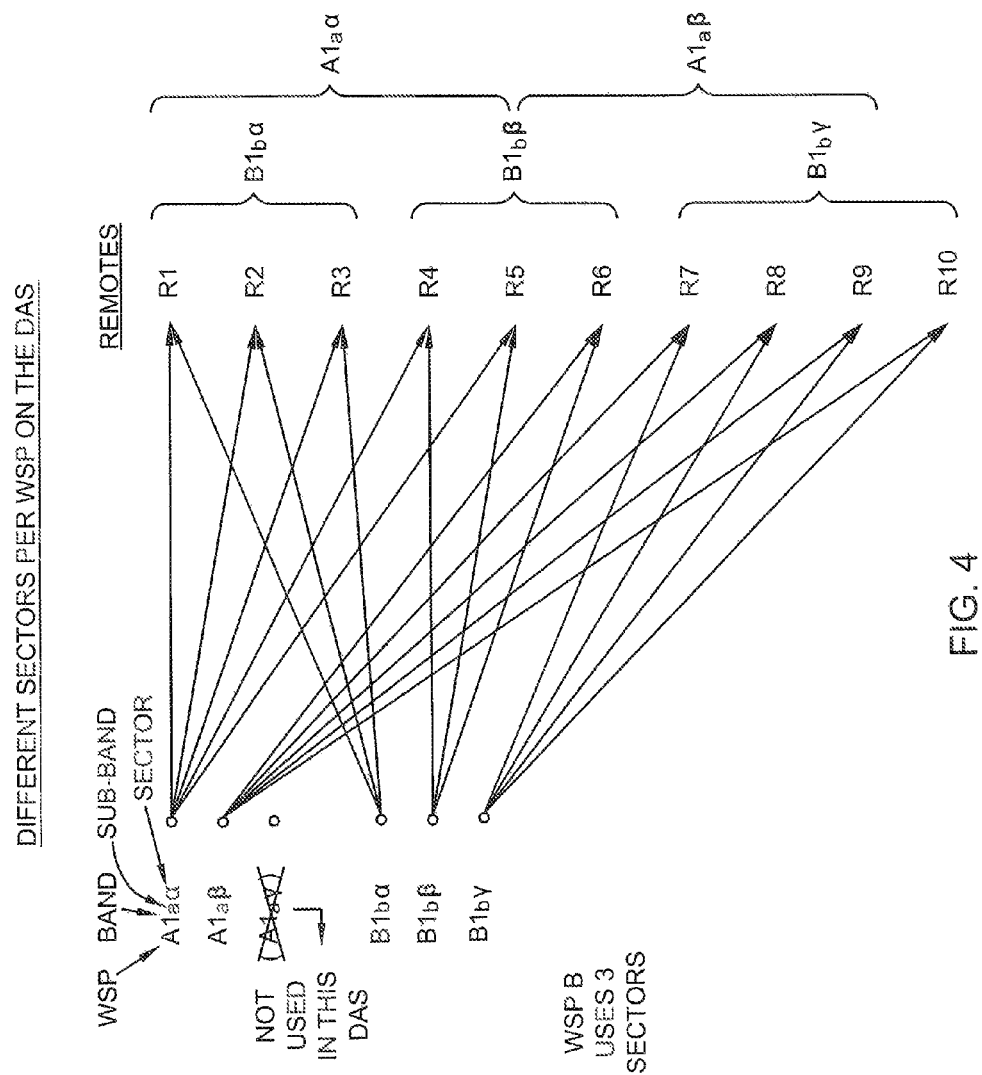
FIG. 4 shows a schematic of one embodiment of the DAS system of the present invention with remote units that carry the uplink and downlink signals of different wireless service provider ("WSP") sectors and sub-bands.

Referring to FIG. 4, a schematic of one embodiment of the different sectors per WSP on the DAS of the present invention are shown. More particularly, in certain embodiments WSP B desires not to use the same sectors that WSP A uses. This could be because the physical layer technologies used in the sectors may be different and require different sectorization. Soft hand off and co-channel interference may also be an issue. In addition, WSP B may desire to bring three sectors of capacity to the venue's DAS, while WSP A may wish to use its Al$_x$α to serve capacity to a different area than the DAS. Still referring to FIG. 4, the R numbers represent RUs that carry the uplink and downlink signals of particular WSP sectors and sub-bands.

Figure 5:
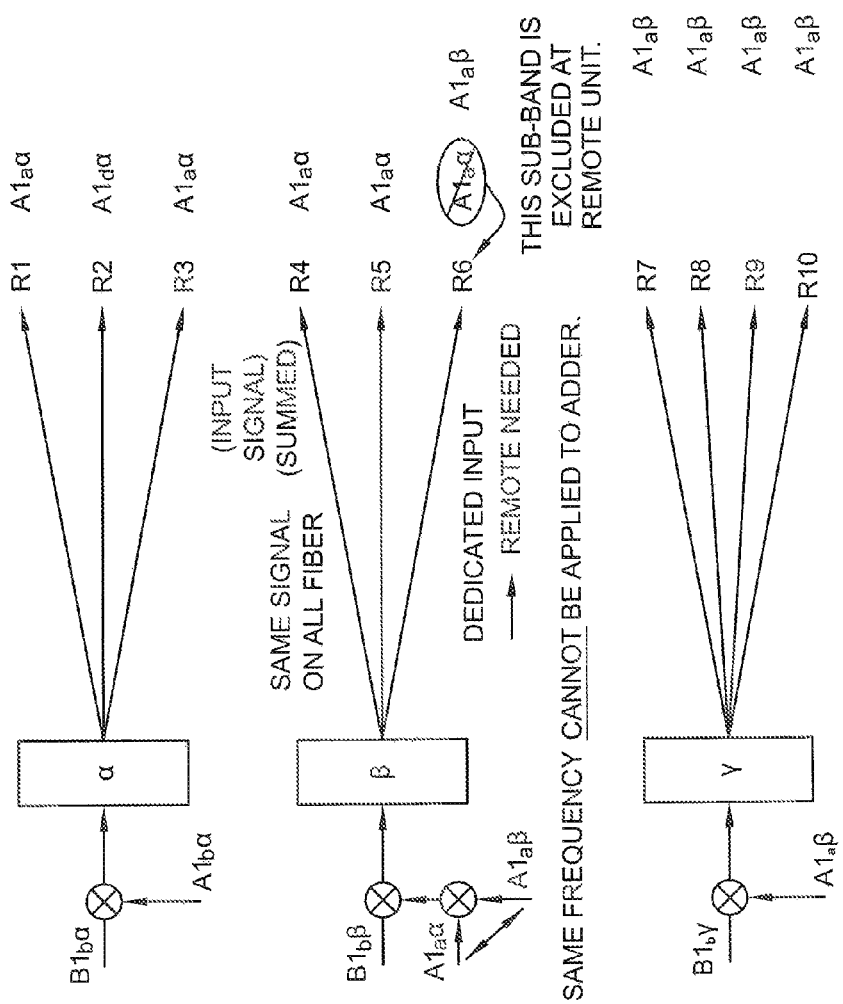
FIG. 5 shows a schematic of one embodiment of configuring the DAS system of the present invention.

Referring to FIG. 5, the diagram shows how three sectors each of two WSPs are summed and routed to ten RUs. In certain embodiments, a dedicated optical path to R6 is required in order to develop the sector split requirements shown. Certain embodiments will implement the desired sectorization, except for RU #6, in this example. In certain embodiments, this RU is in the set dedicated to B's β sector, and therefore is simulcasting across R4, R5, R6. To solve this problem, a dedicated single input module is installed to provide only R6.

Figure 6:
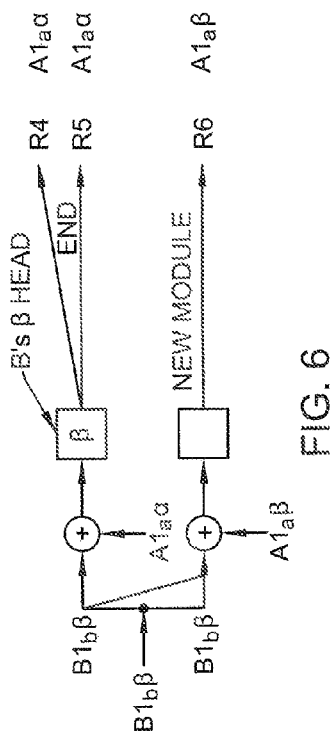
FIG. 6 shows a schematic of one embodiment of the DAS system of the present invention as shown in FIG. 5.

Referring to FIG. 6, the dedicated R6 path required for the sector split requirements as shown in FIG. 5 is shown. More particularly, the diagram shows that configuring the head-end on an exception basis is effective because the head-end is an analog only solution that is relatively low cost. The R6 associated head-end uses a LASER diode, a photodiode, signal conditioning, control and management functions, and the like. These functions can be implemented at a small amount of complexity and cost, relative to the R6 RU itself.

Figure 7:
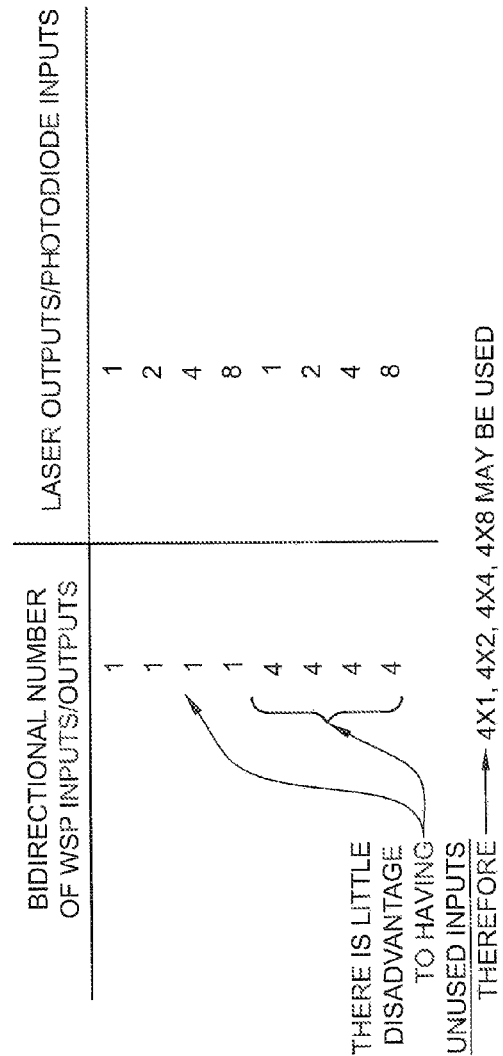
FIG. 7 shows a schematic of several embodiments of the DAS system of the present invention with alternative splitting and combining methods.

In general, a dedicated head-end LASER/photodiode module is required when a combination of sectorization is unique across RUs. In certain embodiments, head-end modules can be designed having appropriate numbers of $N_i$ inputs and $N_o$ outputs. Inputs are $N_i$ WSP input signals to be simulcasted across $N_o$. In certain embodiments, there could be combinations as shown in FIG. 7, for example. Still referring to FIG. 7, typical alternative splitting and combining methods that allow for different numbers of LASER/photodiode optical paths per WSP signal set, and different numbers of WSP signal sets driving different numbers of LASER/photodiode optical paths are shown.

Figure 8:
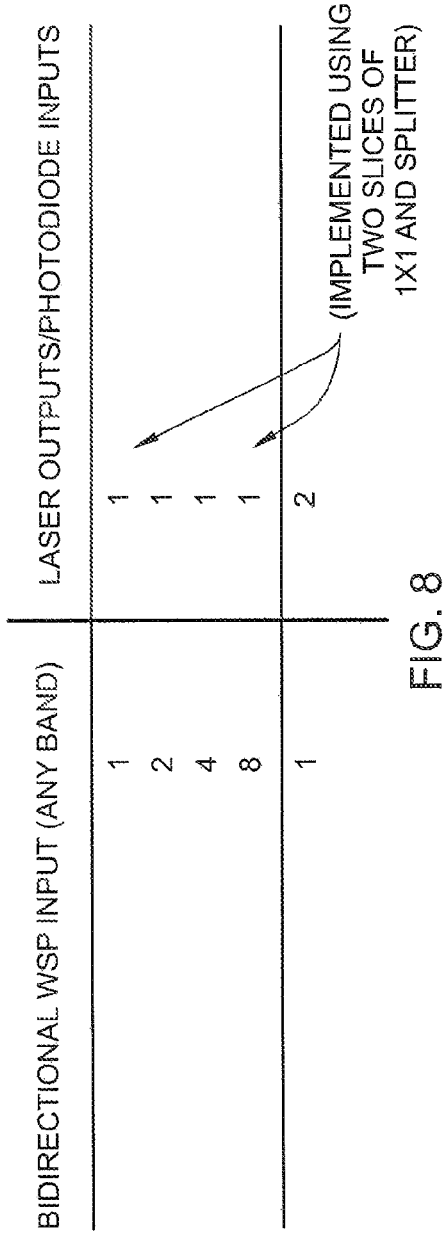
FIG. 8 shows a schematic of several embodiments of the DAS system of the present invention with alternative splitting and combining methods.

Another alternative is to make the LASER slices small enough that all systems are implemented using single LASER modules. See, for example, FIG. 8. Still referring to FIG. 8, the system eliminates unused LASERs and photodiodes. FIG. 8 shows typical alternative splitting and combining methods that allow for different numbers of WSP signal sets driving a LASER/photodiode optical path.

Figure 9:
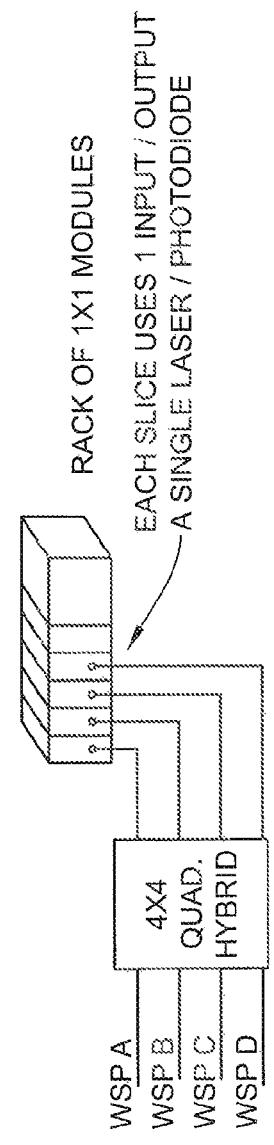
FIG. 9 shows a schematic of one embodiment of the DAS system of the present invention where hybrid combiners may be used to allow multi-WSP signal sets to be serviced by multiple remote units ("RU").

However, WSPs signals must be split externally to drive the necessary number of LASER slices. See, for example, FIG. 9. Still referring to FIG. 9, one embodiment of the system of the present invention may use a quadrature hybrid allowing multiple WSPs to be combined and split in one module. If 4×1 slices are used, the combining of WSPs is accomplished. However, four 1 to 4 splitters are required, one for each WSP, to drive the 4×1 slices. FIG. 9 describes how a single 4×4 hybrid combiner may be used to allow multi-WSP signal sets to be serviced by multiple RUs. Each RU has the capability, using DSP, to selectively control the level of each WSP sub-band, therefore allowing fully flexible routing of any signal through any RU to a server antenna, providing that no co-channel signals exist within this particular signal set of the DAS.

The paths in the figures generally show the downlink paths. Similar choices of sectorization and selective filtering of signals occurs in the uplink path as well. Uplink paths are combined from multiple RUs, at the head end, while downlink paths are split at the head end to drive multiple RUs. In uplink and downlink directions, bidirectional digital filtering in the remote units allows the selective use of a given RU in a given sub-band, by a given WSP. The use of digital filtering in the RU reduces the need for hardware RF switching at the head end to accomplish the same objective of signal flexibility, by one of more WSPs, providing one or more sectors exists within the DAS.

In one embodiment of the present invention, MIMO, for example, is equivalent in signal switching to providing a second sector, because MIMO signals are co-channel to each other. Unlike sectors, the MIMO signals are transmitted to the same RU, on a second fiber, or wavelength, as examples. A switch path in the head end switch is duplicated to provide the second MIMO path to the same RU.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. A distributed antenna system comprising
one or more interfaces to one or more base stations;
one or more optical paths;
one or more analog to digital and/or digital to analog converters;
one or more remote units, having a plurality of sub-bands and digital signal processing;
a photodiode;
a LASER;
one or more server antennas; and
uplink and/or downlink digital filtering, wherein the digital filtering is in one or more remote units thereby improving the uplink and/or downlink Near Far performance of the distributed antenna system, wherein uplink attacks and decay times operating in the automatic gain control feature are dependent on the technology used for the downlink of the same sub-band, and
the selection of the delay of a digital filter in the uplink and/or downlink paths is used to equalize the delay of the transmission time of signals from multiple remote units, while simultaneously meeting the rejection requirements of the digital filter.

2. The distributed antenna system of claim 1, wherein selective uplink and downlink filtering occurs at a first remote unit to allow the selective transmission and reception of a selected sub-band within the first remote unit.

3. The distributed antenna system of claim 2, wherein a downlink combined signal is carried by an optical path to a second remote unit, transmitting the downlink combined signal, wherein the downlink combined signal is filtered by the first remote unit, thereby reducing the requirement for hardware switching of signals.

4. The distributed antenna system of claim 1, further comprising a total power detector to prevent unwanted signals from overloading stages in front of the LASER.

5. The distributed antenna system of claim 1, further comprising a sub-band specific uplink automatic gain control feature within the digital signal processing in the remote unit.

6. The distributed antenna system of claim 1, further comprising one or more detectors operating within the digital signal processing, and in front of the analog to digital converter, to protect the analog to digital converter from overload.

7. The distributed antenna system of claim 1, wherein the digital filtering within a remote can be eliminated when Near Far performance degradation does not occur.

8. The distributed antenna system of claim 1, wherein flexible signal selection is accomplished without requiring an RF switch at the head end, when there are no co-channel signals within a DAS.

* * * * *